Figure 1:
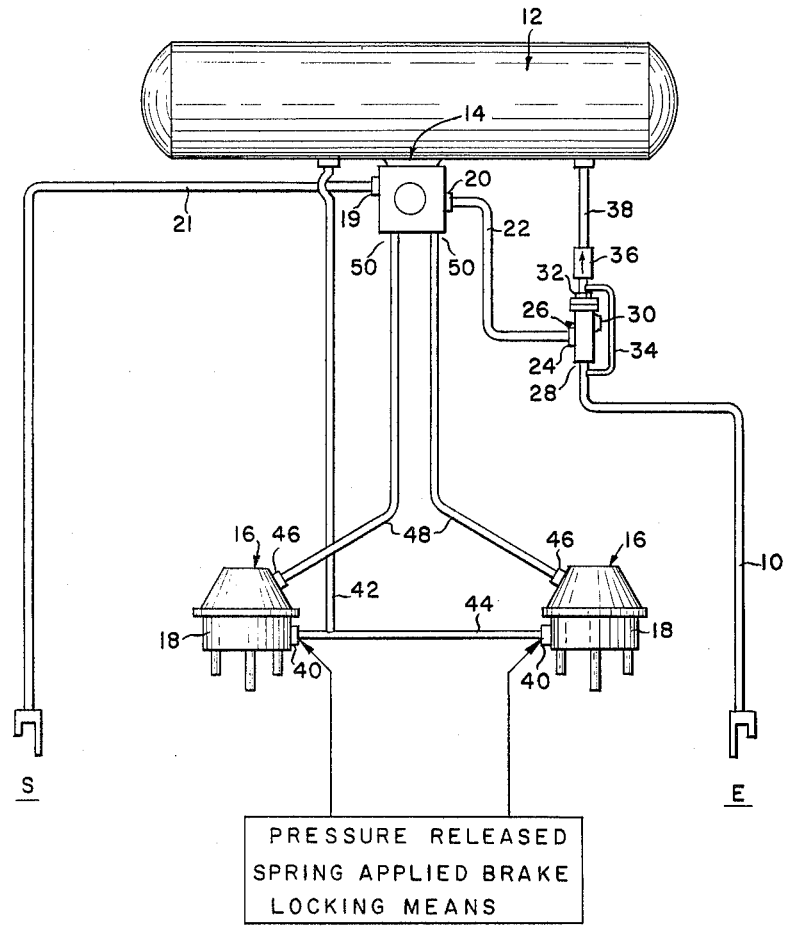

March 15, 1966     F. R. SCHUBERT     3,240,539
AUTOMATIC TRAILER BRAKE AND LOCK RELEASE SYSTEM
Filed April 1, 1965     2 Sheets-Sheet 1

INVENTOR
FRANK R. SCHUBERT

BY
Scrivener Parker Scrivener & Clarke
ATTORNEYS

United States Patent Office 3,240,539
Patented Mar. 15, 1966

3,240,539
AUTOMATIC TRAILER BRAKE AND LOCK
RELEASE SYSTEM
Frank R. Schubert, Elyria, Ohio, assignor to Bendix-Westinghouse Automotive Air Brake Company, Elyria, Ohio, a corporation of Delaware
Filed Apr. 1, 1965, Ser. No. 444,693
6 Claims. (Cl. 303—29)

This invention relates to fluid pressure brake systems for trailers of tractor-trailer combinations and more particularly to trailer brake systems employing pressure released spring applied locking means for retaining the trailer brakes locked in applied position under certain predetermined conditions.

The present invention is concerned with trailer emergency and parking brake means whereby the trailer brakes are locked in applied position upon decrease of trailer braking pressure to a predetermined level. The locking means may comprise locking rollers which are suspended out of locking position when pressure above a predetermined level operates on a lock releasing piston spring urged toward locking position. When the pressure falls to the predetermined level the rollers are moved to locking position wherein the brake actuating rod, if in applied position, is positively prevented from returning to a release position due to one-way jamming action of the rollers with the rod. Locking means to which the present invention is applicable is shown and described in the application of Harry M. Valentine et al., Serial No. 121,970 filed July 5, 1961, and assigned to the same assignee as the present application.

A conventional trailer brake system includes a reservoir and a relay emergency valve to which are connected service and emergency conduits adapted to be releasably connected to corresponding tractor conduits. When the trailer emergency conduit is connected to a source of pressure, fluid pressure is, in the usual arrangement, fed through the relay emergency valve to the reservoir and when the pressure in the reservoir and hence in the emergency line has reached a predetermined high level, the relay emergency valve responds to this pressure to release the trailer brakes. When the pressure in the emergency conduit is released as by disconnection or by trailer breakaway, the relay emergency valve responds to automatically apply the trailer brakes.

When the trailer braking system is also equipped with the locking means as above described, under normal conditions it has been necessary heretofore for the operator to effect release of the trailer locks by a normal service application of the brakes. Should the operator fail to do this the locks could remain jammed in locked position so that the operator drives off with brakes applied thereby causing unnecessary wear and tear.

The broad object of the invention is to provide in a trailer braking system equipped with locks of the described type, means for automatically effecting release of the locks after the trailer pressure is above a minimum safe operating value.

More particularly it is an object of the invention to accomplish the foregoing by the provision of pressure responsive by-pass means which renders the trailer relay emergency valve inoperative to effect release of the brakes until the pressure in the trailer system is above a predetermined minimum, the arrangement being such that so long as the pressure is below the said minimum either the brakes are locked in applied position or braking pressure is applied to the actuators to retain the brakes applied until the trailer system is above the minimum level.

Figure 2:
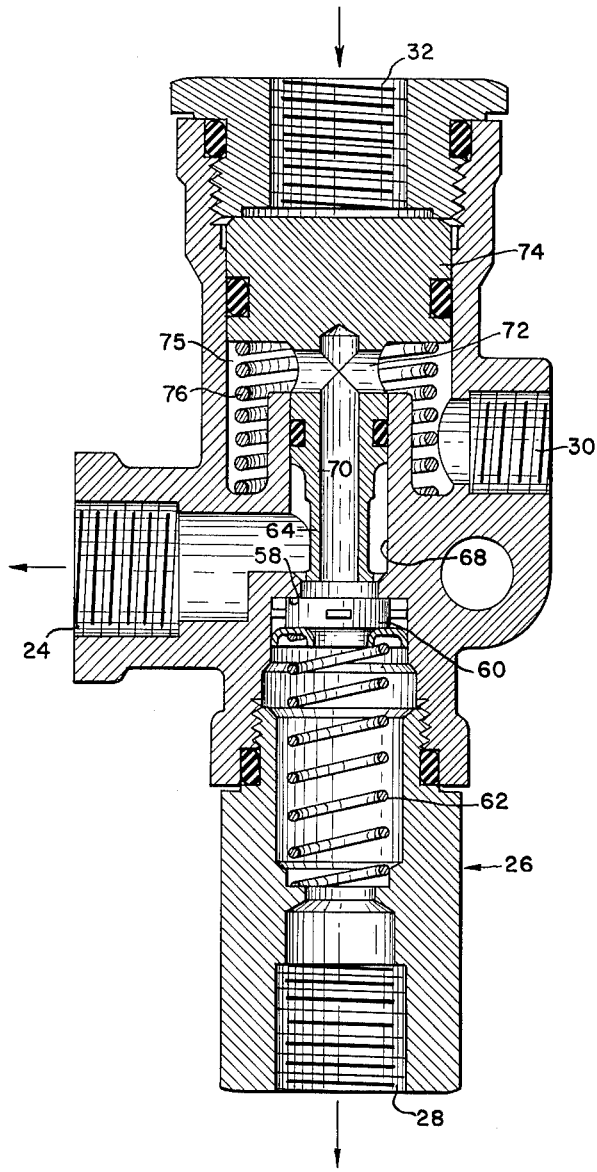

Other objects and their attendant advantages will become apparent as the following description is read in conjunction with the accompanying drawings wherein:

FIG. 1 is a diagrammatic view of a fluid pressure operated trailer braking system constructed in accordance with the principles of the present invention; and FIG. 2 is a sectional view of a control valve mechanism which may be utilized in the system of FIG. 1.

Referring to FIG. 1 the present invention is illustrated therein in connection with a trailer braking system which includes an emergency conduit 10, a fluid pressure reservoir 12, a relay emergency valve 14 which may be of conventional form and constructed as shown in the patent to Gates, No. 2,937,052 dated May 17, 1960, and a pair of brake actuators 16 each provided with locking mechanisms 18 which may be of the type as hereinbefore described. The relay emergency valve 14 has service and control ports 19, 20 to which are connected, respectively, a service conduit 21 and a short branch emergency conduit part 22 which when charged with a pressure at a predetermined level actuates the valve 14 to release pressure from the actuators 16 thereby releasing the brakes.

The relay emergency valve control port 20, instead of being connected directly to the emergency conduit 10 as in the conventional system, is instead connected by the branch emergency conduit part 22 to the delivery port 24 of a control valve member 26 having an inlet port 28, an exhaust port 30, and a control port 32. Leading around the valve member 26 is a bypass conduit 34 which serves to interconnect the emergency conduit 10 with the control port 32 and also with the reservoir 12 through a one way check valve 36 in a conduit 38 leading directly to the reservoir.

The locking mechanism 18 is provided with lock ports 40 which are connected directly to the trailer reservoir 12 by way of conduit 42 and branch conduits 44. The fluid pressure actuator members 16 are provided with the usual inlet ports 46 which are connected by way of conduits 48 to the usual delivery ports 50 of the relay emergency valve 14.

The purpose of the valve 26 is to prevent charging of the branch emergency conduit part 22 and consequent premature release of the brake actuators until after the pressure at the lock ports 40 has risen above releasing pressure while at the same time pressure is applied through relay emergency valve 14 to the actuators to insure that they are moved slightly in a brake applying direction sufficient to insure that the locking rollers are broken entirely free of the actuating rod so that the locking means can move freely and completely to unlocking position.

With reference now to FIG. 2 the valve 26 includes a central valve seat 58 normally closed by a check valve 60 which is urged to seated position by a spring 62. When the check valve 60 is in closed position it serves to disconnect the inlet port 28 of the valve 26 from the delivery port 24 thereby disconnecting the control port 20 of the relay emergency valve 14 from the emergency conduit 10 of FIG. 1.

Spaced axially above the check valve 60 is the lower end of a plunger 60 whose upper end is slidably and sealingly received in a passage 68. The plunger 64 is provided with a central exhaust passage 70 which is connected by way of lateral ports 72 at its upper end with the aforementioned exhaust port 30. Integral with the upper end of the plunger 64 is a piston 74 slidably received in an exhaust cavity 75 communicating at all times with the exhaust passage 30 below the piston. The upper side of the piston 74 is exposed at all times to the control port 32 and a spring 76 urges the piston and its plunger 64 to the upper position of the drawing wherein the delivery port 24 and hence the control port 20 of the relay emergency valve 14 is connected to atmosphere by way of the exhaust passage 70 in plunger 64, ports 72 and exhaust port 30. When the plunger 64 is moved downwardly by the admission of pressure at the control port 32 sufficient to overcome the upward force of the spring 76 the piston 74 is moved downwardly until the lower end of the plunger 64 engages the check valve 60 to first seal off the exhaust passage 70 to disconnect the delivery port 24 from the exhaust port 30 and thereafter move the check valve to open position to connect the inlet port 28 with the delivery port 24 and hence the control port 20 of the relay emergency valve 14.

In operation, assume an initial condition wherein no pressure exists in the trailer braking system and the trailer brakes are applied and locked in applied position due to the absence of releasing pressure at the lock ports 40. Assume now that the emergency and service conduits 10, 21 are connected to their counterparts on the tractor and pressure commences to be delivered to the emergency conduit in the usual manner. From the conduit 10, fluid flows by way of the by-pass conduit 34 around the valve member 26 and through the check valve 36 into the trailer reservoir 12. As the pressure builds up in the trailer reservoir fluid flows freely through the relay emergency valve 14 to the actuator ports 46 of the actuators 16 by way of the conduits 48. At the same time fluid flows directly from the trailer reservoir 12 to the lock ports 40 by way of the conduits 42 and 44. As the pressure continues to build up in the emergency conduit 10 and the trailer reservoir 12, there is an ever increasing brake application force applied to the actuators at the same time that pressure is delivered to the lock release ports 40. When pressure sufficient to effect movement of the locking means to unlocking position is reached at the lock ports this same pressure also operates on the actuators to insure that the locking means are broken entirely free from the actuator rods and the locking means returned to their full release position.

As the pressure continues to rise in the emergency conduit 10 and the reservoir 12, it reaches a predetermined high value where it operates through the control port 32 of the valve 26 to move the piston 74 downwardly to disconnect the exhaust port 30 from the delivery port 24 while at the same time moving the check valve 60 to open position to connect the inlet port 28 with the delivery port 24 so that emergency pressure flows by way of the emergency conduit part 22 to the control port 20 of the relay emergency valve 14 to actuate the same and effect release of actuating pressure from the actuators 16 whereby the brakes move in their customary manner to released position.

Assuming now that the trailer is disconnected from the tractor and the emergency conduit 10 is suddenly opened to atmosphere. Upon this occurrence the pressure at the control port 32 of the valve 26 is released to atmosphere and the piston 74 moves to the position of FIG. 2 to connect the delivery port 24 and hence the control port 20 of the relay emergency valve 14 to atmosphere by way of the exhaust passage 70, ports 72 and exhaust port 30. Upon this occurrence the relay emergency valve operates to immediately supply full reservoir pressure to the actuators 16 to automatically apply the trailer brakes. Should the pressure in the trailer reservoir now recede, as might be expected over a period of time, a pressure level is reached at which the locks move into locking position so as to retain the trailer brakes applied even after pressure in the trailer reservoir falls to zero.

One of the particular advantages of the arrangement of the invention is that the valve 26 eliminates any possibility of a premature release of the brakes, prior to the release of the locking mechanism, because of accidental charging of the emergency conduit part 22 by reverse leakage of fluid pressure from the reservoir past either check valve 60 or the conventional charging check valve (not shown) in the relay emergency valve. Any leakage of the foregoing nature cannot build up in the emergency conduit part 22 but must flow directly to atmosphere through the open flow path between the exhaust port 30 and the delivery port 24 as above described.

From the foregoing description, it should now be apparent that the present invention provides an arrangement which eliminates the necessity of a driver having to remember to make a service application of the brakes in order to insure release of the locks before driving off while at the same time the system of the invention positively and safely insures the automatic release of the trailer brakes but only after the pressure in the trailer system has risen to normal operating values. It will of course be apparent to those skilled in the art that the invention is susceptible of a variety of modifications and changes without, however, departing from the scope and spirit of the appended claims.

What is claimed is:

1. In combination with a trailer braking system including a trailer fluid pressure reservoir, fluid pressure operated brake actuators, spring applied fluid pressure released brake locking mechanism for locking trailer brakes in applied position and including a fluid pressure lock release port connected to said reservoir, said locking mechanism being movable to unlocking position when the pressure in said reservoir is above a predetermined level, a relay emergency valve including a control port between said actuators and said reservoir for automatically controlling the flow of fluid from said reservoir to said actuators and from said actuators to atmosphere depending upon whether the pressure at said control port is above or below a predetermined level, the invention which comprises an emergency conduit directly connected to said reservoir, branch fluid pressure conduit means including control valve mechanism connecting the control port of the relay-emergency valve with said emergency conduit, said control valve mechanism including a normally open exhaust valve connecting said control port to atmosphere and a normally closed check valve disconnecting said control port from said emergency conduit, and fluid pressure responsive valve operating means connected to said emergency conduit and being responsive to a pressure in said conduit in excess of unlocking pressure to close said exhaust valve and to open said normally closed valve to deliver elevated emergency conduit pressure to the control port of said relay emergency valve to effect release of pressure from said actuators.

2. The combination of claim 1 including a check valve in said emergency conduit between said reservoir and said branch fluid pressure conduit means, said check valve permitting flow of fluid pressure towards said reservoir while preventing flow in the reverse direction.

3. In combination with a trailer braking system including a trailer fluid pressure reservoir, fluid pressure operated brake actuators, spring applied fluid pressure release brake locking mechanism for locking the trailer brakes in applied position and including a fluid pressure lock release port connected to said reservoir, said locking mechanism being movable to unlocking position when the pressure in said reservoir is above a predetermined level, a relay emergency valve between said reservoir and said actuators and including a control port for automatically controlling the flow of fluid from said reservoir to said actuators or from said actuators to atmosphere depending upon whether the pressure at said control port is above or below a predetermined level, the invention which comprises an emergency conduit directly connected to said reservoir, branch fluid pressure conduit means including control valve mechanism connecting the control port of relay emergency valve with emergency conduit, said valve mechanism including normally closed check valve means disconnecting said control port from said emergency conduit and fluid pressure responsive valve operating means connected to said emergency conduit and being responsive to a pressure in said emergency conduit in excess of unlocking pressure to open said check valve means to deliver pressure from the emergency conduit to the control port of relay emergency valve to effect release of pressure from said actuators following movement of said locking mechanism to unlocking position.

4. In combination with a trailer braking system including a trailer fluid pressure reservoir, fluid pressure operated brake actuators, a relay emergency valve including a control port for automatically controlling the flow of fluid from said reservoir to said actuators or from said actuators to atmosphere depending upon whether the pressure at said control port is above or below a predetermined level, the invention which comprises an emergency conduit directly connected to said reservoir, branch fluid pressure conduit means including control valve mechanism connecting the control port of said relay emergency valve with said emergency conduit, said valve mechanism including normally closed check valve means disconnecting said control port from said emergency conduit and fluid pressure responsive valve operating means connected to said emergency conduit and being responsive to a pressure in said emergency conduit in excess of a predetermined pressure to open said check valve and deliver pressure from the emergency conduit to the control port of said relay emergency valve to effect release in pressure from said actuators.

5. The combination of claim 4 wherein said control valve mechanism includes a normally open exhaust valve connecting said control port to atmosphere and said fluid pressure responsive means is operatively connected to said exhaust valve to close the same upon opening of said check valve means and vice versa.

6. The combination of claim 4 including a one-way check valve in said emergency conduit between said reservoir and said branch conduit, said check valve permitting flow of fluid pressure to emergency reservoir while preventing flow in the reverse direction.

References Cited by the Examiner

UNITED STATES PATENTS 2,859,763   11/1958   Fitz _____ 303—29 X

FOREIGN PATENTS 1,155,467   4/1962   Germany.

EUGENE G. BOTZ, *Primary Examiner.*